No. 731,538.

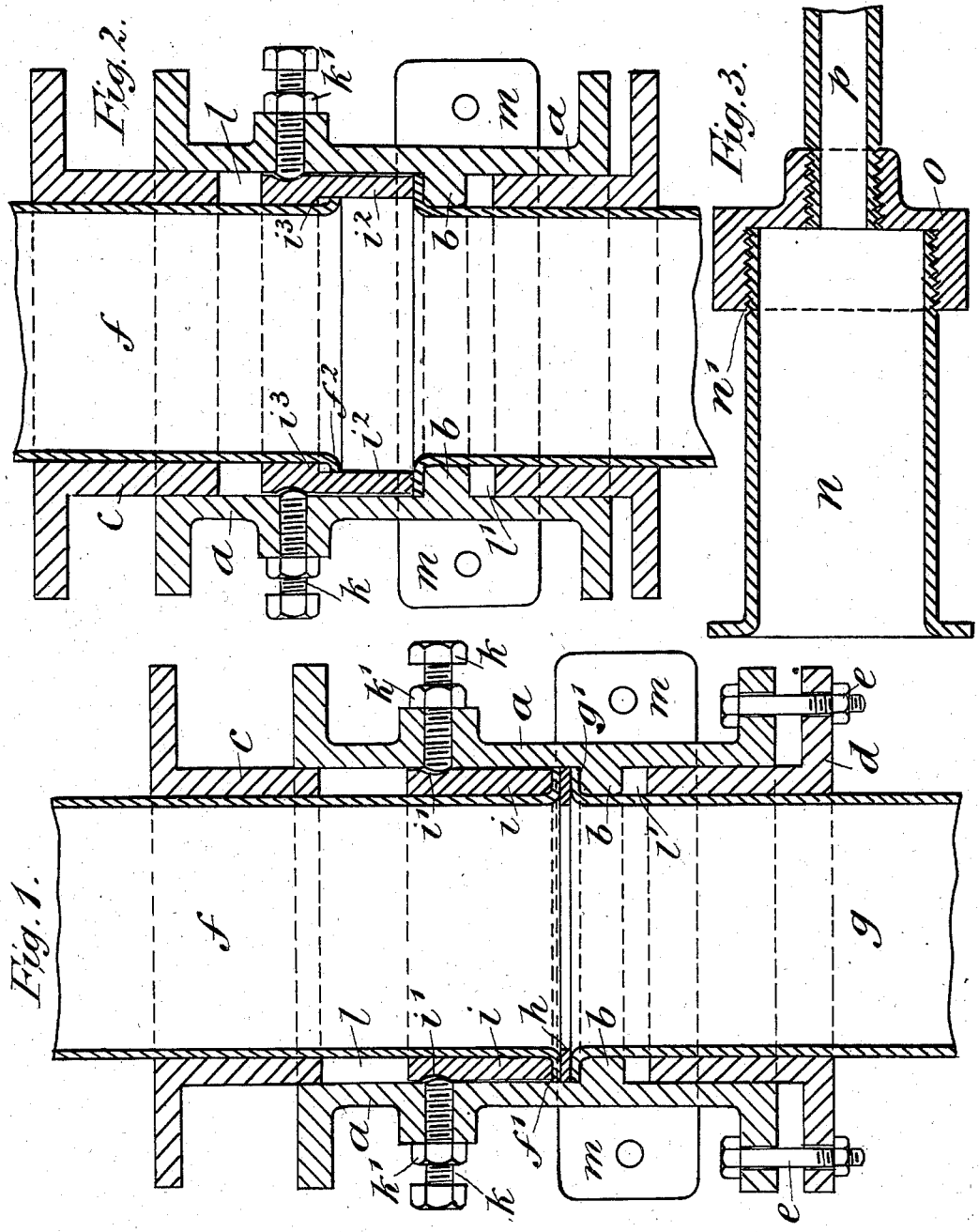

Patented June 23, 1903.

UNITED STATES PATENT OFFICE.

HORACE WALTER BRADLEY AND HERBERT PEACE, OF THRYBERGH, NEAR ROTHERHAM, ENGLAND.

PIPE-COUPLING.

SPECIFICATION forming part of Letters Patent No. 731,538, dated June 23, 1903.

Application filed April 21, 1902. Serial No. 103,958. (No model.)

*To all whom it may concern:*

Be it known that we, HORACE WALTER BRADLEY, mechanic, and HERBERT PEACE, carpenter and joiner, both subjects of the King of Great Britain and Ireland, and both residing at Silverwood, Thrybergh, near Rotherham, in the county of York, England, have invented certain new and useful Improvements in Pipe-Couplings, of which the following is a specification.

This invention relates to improvements in pipe-couplings, and is especially applicable to steam, air, gas, or water mains formed of steel pipes or tubes and is adapted for ordinary or expanding joints.

The improved joint comprises a coupling-box formed with an internal ring or collar and fitted at each end with packing-glands. The jointed ends of the pipes are formed with external flanges, one of which bears against the ring or collar, while between the two is placed a packing-ring of asbestos or india-rubber. A metal retaining ring or tube bears against the flange of the other tube or pipe so as to grip the said flanges between it and the internal ring or collar, the packing-ring rendering the joint thus formed steam and water tight. The retaining ring or tube is fixed in position by means of set-screws, and packing is placed between it and the gland at one end of the box and between the internal ring or collar and the gland at the other end. For expanding joints the retaining ring or tube is formed with an internal rim or projecting portion forming a stop for the end of the pipe engaging therewith, which end is curved outward or slightly flanged for this purpose, thus permitting the necessary sliding motion in either direction of the same. Pipes of different diameters may also be coupled together by forming a screw-thread on the outer end of one of the aforesaid coupling tubes or pipes and screwing thereto a metal coupling to which the pipe of reduced diameter is screwed.

In order to clearly understand our invention, reference is had to the accompanying sheet of drawings, in which—

Figure 1 is a vertical section of the coupling-box, showing two pipes in their fixed or coupled position. Fig. 2 is a modification of a similar view, showing an expanding coupling-joint; and Fig. 3 is a modification of one of the coupling-tubes as used for coupling pipes of different diameters.

$a$ is the coupling-box, and $b$ the internal ring or collar formed therein.

$c$ is the packing-gland fitted to one end of the box, and $d$ the gland fitted to the other end, the said glands being tightened up by the bolts and nuts $e$. (Shown only in connection with the gland $d$ of Fig. 1.)

$f$ is one of the pipes to be coupled, and $g$ the other, and $f'$ $g'$ are the flanges respectively formed on the same. $h$ is the asbestos or india-rubber packing-ring placed between the said flanges.

$i$ is the retaining ring or tube, which bears at one end against the flange $f'$ and is formed at its other end with a recess $i'$, running around the same, and with which engage the set-screws $k$, fixed by the lock-nuts $k'$, and bearing against the lower part of the recess $i'$, which is suitably curved to cause the said screws to jam the ring or tube $i$ against the flange $f'$, and thus secure a tight joint, the flange $g'$ of the pipe $g$ bearing against the ring or collar $b$.

$l$ $l'$ are the packing-spaces for the glands, and $m$ is the bracket or flanges for securing the coupling-box in position, either in a vertical or a horizontal position.

In the expanding joint-coupling (shown in Fig. 2) the retaining ring or tube $i$ is formed with the internal rim or projecting portion $i^2$, and the end of the pipe $f$ is turned over or flanged, as at $f^2$, to prevent the uncoupling of said pipe, while at the same time permitting of lengthwise motion for expansion and contracting.

Fig. 3 shows the manner of coupling together pipes, one of which is of reduced diameter to the other, $n$ being a coupling-tube corresponding to the tube $g$ in Fig. 1, but cut short and formed with a screw-thread $n'$ outside the packing-gland and to which is screwed the coupling-piece $o$, the pipe $p$ of reduced diameter being itself screwed, as shown, to the said piece $o$.

By means of this invention the joints are prevented from "blowing," and the glands can be repacked when the pipe is under steam.

Having now fully described the nature of our said invention, what we claim, and desire to secure by Letters Patent, is—

1. The improved pipe-coupling comprising a coupling-box formed with an internal ring or collar, a retaining ring or tube carried in said box and bearing against a flange on the end of one of the pipes to be coupled, a packing-ring placed between the said flange and a similar flange on the end of the other pipe, set-screws engaging with the retaining ring or tube for causing the latter to clamp the flanges between it and the internal ring or collar, and packing-glands fitting the pipes at each end of the coupling-box, substantially as described.

2. In an expanding and contracting pipe-coupling the combination of a coupling-box formed with an internal ring or collar against which a flange on one of the pipes bears, a retaining ring or tube bearing against the other side of said flange, set-screws for holding the ring or tube in its clamping position, a flanged or turned-over end formed on the other pipe and engaging with a rim or enlarged portion formed on the ring or tube for permitting of the sliding motion of said pipe, and packing-glands at each end of the coupling-box, substantially as described.

In witness whereof we have hereunto set our hands in the presence of two witnesses.

HORACE WALTER BRADLEY.
HERBERT PEACE.

Witnesses:
WALTER BAXTER,
CHARLES CHANDLEY.